UNITED STATES PATENT OFFICE.

JACOB R. ROETHER, OF BROOKLYN, NEW YORK.

WATERPROOFING MATERIAL.

1,414,670.   Specification of Letters Patent.   Patented May 2, 1922.

No Drawing.   Application filed November 5, 1920.   Serial No. 421,851.

*To all whom it may concern:*

Be it known that I, JACOB R. ROETHER, a citizen of the United States, residing in the city of New York, county of Kings, borough of Brooklyn, and State of New York, have invented certain new and useful Improvements in Waterproofing Materials, of which the following is a full, clear, and exact specification.

My invention relates to water-proofing materials and refers particularly to water-soluble water-proofing material.

Many attempts have been made to produce satisfactory and economic water-proofing materials, but they have possessed disadvantageous chemical and commercial properties which have prevented their extended adoption.

A satisfactory water-proofing material must have many properties among which are economy of production, uniformity of constituency, ease of application, and when applied to fabrics it must not harden the fibers, must be capable of uniform application and must not affect the dyeings.

The water-proofing material of my invention possesses all of these and many other valuable properties, as will be observed upon a consideration of my specification and claims.

I have discovered that when shellacs, gums, resins and resinous-like substances are treated with a soap made from animal fats and vegetable oils, there results a material which is practically soluble in water and which, when applied and dried, possesses valuable water-proofing properties.

The material of my invention is practically soluble in water, and hence, may be readily and uniformly applied to the object to be water-proofed.

When applied to textile fabrics, it leaves the fibers in a soft pliable condition, does not have an injurious effect upon the fastness of dyeings and gives the fabric a most desirable finish.

It can be used wherever a water-proof material is desired and its ease of application and economy of cost renders it a most valuable material for this purpose.

As one example of following the process of my invention, I give the following:—

Ten pounds of tallow and ten pounds of cocoanut oil are mixed together and saponified by caustic soda to form a neutral soap. The mixture is diluted to a thin consistency by means of water and, while boiling, twenty pounds of paraffin are added and the mixture stirred to a uniform mixture. While the mixture is boiling, five pounds of melted cumarone resin, known commercially as Cumar, are slowly added with constant agitation and, when thoroughly mixed, twenty pounds of linseed oil are added and the mixture boiled and stirred. When a thorough mixture is obtained, it is evaporated to the required consistency. The resulting material may be mixed with the necessary quantity of water and warmed, thus forming a practical solution of the product and it is then ready for application.

In applying it to fabrics, the goods are thoroughly worked in the warm solution of my product, wrung out and dried, a hot pressing, or calendering, improving the water-proofing effect.

On account of the chemical consistency of my product, it can be readily mixed with sizes and finishes, thus allowing of the sizing, or finishing, and the water-proofing in one operation.

I do not limit myself to any particular animal fat, or vegetable oil, as I have found that a very great number of them are suitable for the production of my product, the resulting material varying slightly with the particular fat, or oil, employed but all possessing the water-proofing characteristics.

Neither do I limit myself to caustic soda, as caustic potash or other saponifying chemicals may be used.

I have also found that the shellacs, gums, resins and resinous-like products, whether of vegetable or coal-tar origin, have the property of producing water-proofing materials by my process, the particular gum, resin or resinous compound being employed which will give the desired qualities to the resulting product, and, by "resinous material" I refer to those shellacs, resins and resinous-like materials which will produce a water-proofing material by my process.

By "water-resistant" materials I mean those gums and resinous materials which will produce a water-proofing material by my process.

Therefore, I do not limit myself to the particular substances, quantities, temperatures, amounts, or mode of procedure, particularly mentioned, as all of them may be varied without going beyond the scope of my invention as described and claimed.

What I claim is:—

1. A process for producing a water-proofing material which comprises producing a neutral soap from an animal fat and a vegetable oil and adding melted cumarone resin thereto.

2. A process for producing a water-proofing material which comprises producing a neutral soap from an animal fat and a vegetable oil, adding paraffin thereto and adding melted cumarone resin to the mixture formed as above.

3. A process for producing a water-proofing material which comprises producing a neutral soap from an animal fat and a vegetable oil, adding thereto a melted water-resistant and adding linseed oil to the mixture formed as above.

4. A process for producing a water-proofing material which comprises producing a neutral soap from an animal fat and a vegetable oil, adding paraffin thereto, adding a melted water-resistant to the above mixture and then adding linseed oil.

5. A process for producing a water-proofing material which comprises producing a neutral soap from an animal fat and a vegetable oil, adding melted cumarone resin thereto and adding linseed oil to the mixture formed as above.

6. A process for producing a water-proofing material which comprises producing a neutral soap from an animal fat and a vegetable oil, adding paraffin thereto, adding melted cumarone resin to the above mixture and then adding linseed oil.

7. The water-proofing material which comprises a neutral soap formed from an animal fat and a vegetable oil and cumarone resin.

8. The water-proofing material which comprises a neutral soap formed from an animal fat and a vegetable oil, paraffin and cumarone resin.

9. The water-proofing material which comprises a neutral soap formed from an animal fat and a vegetable oil, a water resistant and linseed oil.

10. The water-proofing material which comprises a neutral soap formed from an animal fat and a vegetable oil, paraffin, a water resistant and linseed oil.

11. The water-proofing material which comprises a neutral soap formed from an animal fat and a vegetable oil, cumarone resin and linseed oil.

12. The water-proofing material which comprises a neutral soap formed from an animal fat and a vegetable oil, paraffin, cumarone resin and linseed oil.

Signed at New York city, in the county of New York and State of New York, this 4th day of November, 1920.

JACOB R. ROETHER.